(12) United States Patent
Peterson et al.

(10) Patent No.: US 7,360,092 B1
(45) Date of Patent: Apr. 15, 2008

(54) MARKING AND IDENTIFYING WEB-BASED AUTHENTICATION FORMS

(75) Inventors: Christopher N. Peterson, North Bend, WA (US); Ismail Cem Paya, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 802 days.

(21) Appl. No.: 10/424,305

(22) Filed: Apr. 28, 2003

(51) Int. Cl.
*H04L 9/00* (2006.01)
*H04K 1/00* (2006.01)
*G06F 11/30* (2006.01)

(52) U.S. Cl. ............ 713/175; 713/150; 713/182

(58) Field of Classification Search .......... 726/2–21; 713/155–176, 150, 182; 715/700–866
See application file for complete search history.

(56) References Cited

U.S. PATENT DOCUMENTS

| | | | |
|---|---|---|---|
| 5,875,249 A | 2/1999 | Mintzer et al. | |
| 6,028,938 A * | 2/2000 | Malkin et al. | 713/176 |
| 6,246,777 B1 | 6/2001 | Agarwal et al. | |
| 6,512,849 B1 | 1/2003 | Yair et al. | |
| 6,532,301 B1 | 3/2003 | Krumm et al. | |
| 6,968,455 B2 * | 11/2005 | Okayasu et al. | 713/176 |
| 6,973,571 B2 * | 12/2005 | Lee et al. | 713/168 |
| 2001/0045451 A1 | 11/2001 | Tan et al. | |
| 2002/0033844 A1 * | 3/2002 | Levy et al. | 345/744 |
| 2002/0194501 A1 | 12/2002 | Wenocur et al. | |
| 2003/0093699 A1 * | 5/2003 | Banning et al. | 713/202 |
| 2004/0030934 A1 * | 2/2004 | Mizoguchi et al. | 713/202 |
| 2005/0074126 A1 | 4/2005 | Stanko | |
| 2005/0216771 A1 | 9/2005 | Malcolm | |

OTHER PUBLICATIONS

Gausemeier et al., "Development of a Real Time Image Based Object Recognition Method for Mobile AR-Devices," Proceedings of the Second International Conference on Computer Graphics, Virtual Reality, Visualization and Interaction in Africa, 2003, pp. 133-139, ACM Press, New York, U.S.A.

Cosby et al., "IRS: A Hierarchical Knowledge Based System for Aerial Image Interpretation," Proceedings of the Third International Conference on Industrial and Engineering Applications of Artificial Intelligence and Expert Systems, 1990, pp. 207-215, vol. 1, ACM Press, New York, U.S.A.

Chung et al., "Topic-Oriented Collaborative Crawling," Proceedings of the Eleventh International Conference on Information and Knowledge Management, 2002, pp. 34-42, ACM Press, New York, U.S.A.

(Continued)

*Primary Examiner*—Nasser Moazzami
*Assistant Examiner*—Chinwendu C Okoronkwo
(74) *Attorney, Agent, or Firm*—Senniger Powers LLP (57) ABSTRACT

Distinctively marking authentication forms and preemptively searching for and detecting unauthorized authentication forms. The invention includes creating a sign-in module having an identifying characteristic and presenting the created sign-in module to the user via a user interface. The invention also includes searching a plurality of web pages for the identifying characteristic and determining whether each of the searched web pages is authorized to include the created sign-in module.

21 Claims, 4 Drawing Sheets

OTHER PUBLICATIONS

Craver et al., "Technical Trials and Legal Tribulations," Communications of the ACM, Jul. 1998, pp. 45-54, vol. 41, Issue 7, ACM Press, New York, U.S.A.

Landau et al., "Pattern Matching in a Digitized Image," Proceedings of the Third Annual ACM-SIAM Symposium on Discrete Algorithms, 1992, pp. 453-462, ACM Press, New York, U.S.A.

Pernus et al., "Two Dimensional Object Recognition Using Multiresolution Non-Information-Preserving Shape Features," Pattern Recognition Letters, 1994, 18 pages, vol. 15, University of Ljubljana, Ljubljana, Slovenia.

Except from www.catenarysystems.com/howto/findmark.html, "Pattern Recognition, Find a Mark in an Image," Victor Image Processing Library, 2003, 4 pages.

Yuan et al., "Web Spoofing 2001," Dartmouth Technical Report TR2001-409, Department of Computer Science, Dartmouth College, Hanover, New Hampshire, Jul. 2001, 16 pages, U.S.A.

Ye et al., "Web Spoofing Revisited: SSL and Beyond," Dartmouth Technical Report TR2002-417, Department of Computer Science, Dartmouth College, Hanover, New Hampshire, Feb. 1, 2002, 15 pages, U.S.A.

Masood, "15 Seconds: Fighting Spambots with .Net and AI," Online, Feb. 2, 2004, printed from http://www.internet.com/icom_cgi/print/print/cgi?url=http://www.15seconds.com/issue/040202.htm, 16 pages.

Baird et al., "Human Interactive Proofs and Document Image Analysis," Proceedings of the 5th IAPR International Workshop on Document Analysis Systems, Aug. 2002, 7 pages, Princeton, NJ, U.S.A.

* cited by examiner

MARKING AND IDENTIFYING WEB-BASED AUTHENTICATION FORMS

TECHNICAL FIELD

The present invention relates to the field of sign-in security for web resources. In particular, this invention relates to distinctively marking authentication forms and preemptively searching for and detecting unauthorized authentication forms.

BACKGROUND OF THE INVENTION

Web sites such as Internet sites often provide information, products, services, and the like to their users. Many web sites require users to register before their web servers will grant access to the users. During registration, a user typically supplies personal information such as a username, account number, address, telephone number, e-mail address, computer platform, age, gender, and/or hobbies to the registering web site. The registration information may be necessary to complete transactions (e.g., commercial or financial transactions). When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site.

Although presently available user authentication systems permit a web user to enter a login ID and associated password to access a web server or service, further improvements are desired. When a user on a client computer communicates with a server computer such as a web site via, for example, a hypertext transfer protocol (HTTP), there is often a need to share authentication information between the client and the server. Transactional communications between a client computer and a server computer are at risk of interception by a third party. For example, there is a risk of a spoofing attack. A spoofing attack is an attack that attempts to con one or more users into making security decisions based on a misleading context. This is often in the form of a single web page interface, but can be as involved as an entire website (or several websites). This type of attack is especially dangerous because the user is lulled into a false sense of security into a context that is completely controlled by an attacker. The goal for an attacker can range from communicating misleading information to compromising security credentials and other personal information from users. There have been high profile attacks against existing web sites in which user profile data and financial information have been compromised.

Web spoofing poses a threat to both businesses and end users as authentication through web pages becomes more pervasive. Authentication systems play a critical role in enabling products and services. Web spoofing attacks designed to capture credentials (e.g., spoofed sign-in modules) not only compromise individual user accounts, but also compromise the security of the entire authentication system. Any web spoofing attack on an authentication service decreases the trustworthiness of the authentication service. There is a need for a tool to detect spoofed sign-in modules and other fraudulent authentication forms.

Existing methods of spoof detection primarily require human intervention to identify spoofing attempts. For example, one manual process includes a savvy user reporting a suspicious web page to the authentication system. An incident response team associated with the authentication system investigates the problem by viewing the suspicious web page and taking action based on the investigation. Such existing methods are time consuming, expensive, and typically identify spoofing attempts only after such attempts have successfully fooled one or more users.

For these reasons, a system for distinctively marking authentication forms and preemptively searching for and detecting unauthorized authentication forms is desired to address one or more of these and other disadvantages.

SUMMARY OF THE INVENTION

The invention enables identification of unauthorized authentication forms such as sign-in modules. In particular, the invention includes creating an authorized sign-in module having a field for entry of credential information associated with a user. The authorized sign-in module also has an identifying characteristic. The invention includes searching a plurality of web pages for the identifying characteristic. For each searched web page having the identifying characteristic, the invention compares the searched web page to a defined list of authorized web pages. The invention includes performing a pre-determined action if the searched web page is absent from the list of authorized web pages.

The invention simplifies detection of spoofed authentication forms by distinctively marking web pages (e.g., with an identifying characteristic) to improve the odds of automated detection by a machine. For example, a watermark may be added to an authentication form such that the presence or absence of the watermark is detectable. The identifying characteristic is selected such that it is extremely unlikely that the identifying characteristic would occur naturally on other web pages unless the content was intentionally copied from the legitimate authentication form. Further, in one form, the identifying characteristic is apparent to the user such that recreating the authentication form in high fidelity without the identifying characteristic is not possible. The invention accelerates response times to spoofing attacks and, in one embodiment, employs web crawlers that preemptively scan networked web pages for unauthorized authentication forms.

In accordance with one aspect of the invention, a computer-readable medium stores a data structure representing a user interface for a sign-in module associated with an authentication system. The sign-in module is presented to a user during authentication. The data structure includes a field for entry of credential information associated with the user. The data structure also includes an identifying characteristic in the presented sign-in module for indicating that the presented sign-in module is authorized to be associated with the authentication system.

In accordance with another aspect of the invention, a method aids identification of an unauthorized sign-in module by a user. The method includes creating a sign-in module associated with an authentication system. The sign-in module has a field for entry of credential information associated with the user. The sign-in module has an identifying characteristic. The method also includes presenting the created sign-in module to the user via a user interface. The identifying characteristic in the presented sign-in module indicates that the presented sign-in module is authorized to be associated with the authentication system.

In accordance with still another aspect of the invention, a method detects an unauthorized sign-in module. The method includes defining a sign-in module having a field for entry of credential information associated with a user. The sign-in module also has an identifying characteristic. The method also includes searching a plurality of web pages for the identifying characteristic. For each one of the searched web pages including the identifying characteristic, the method also includes determining whether the searched web page is authorized to include the defined sign-in module.

In accordance with yet another aspect of the invention, a security system for a sign-in module includes a watermark component and an automated agent. The watermark component creates a sign-in module associated with an authentication system. The sign-in module has a field for entry of credential information associated with the user. The sign-in module also has an identifying characteristic. The created sign-in module is presented to the user via a user interface. The identifying characteristic in the presented sign-in module indicates that the presented sign-in module is authorized to be associated with the authentication system. The automated agent searches a plurality of web pages for the identifying characteristic and determines whether each one of the searched web pages having the identifying characteristic is authorized to include the sign-in module created by the watermark component.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
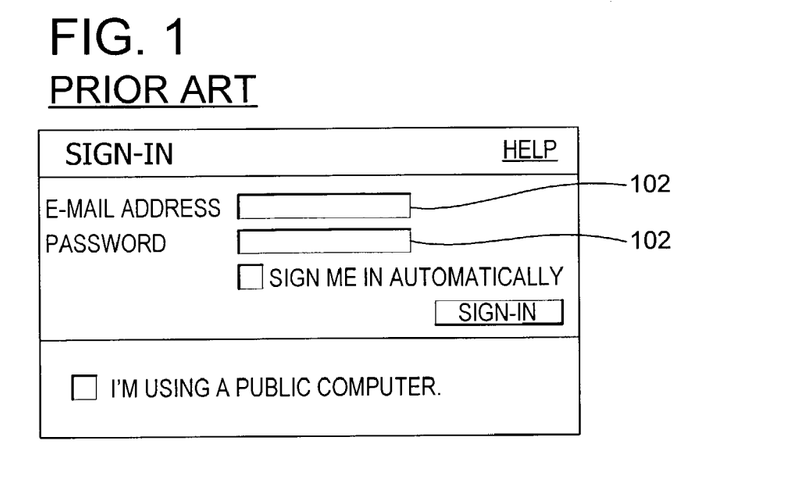
FIG. 1 is a screen shot of an exemplary user interface presenting a sign-in module according to the prior art.

Referring first to FIG. 1, a screen shot shows an exemplary user interface presenting a sign-in module according to the prior art. The sign-in module includes fields 102 for user entry of credential information needed to access a protected resource. The credential information is necessary to authenticate the user. In general, a credential includes a means for generating an authenticated reference to a single account identifier. For example, a login name, a password, an electronic mail address, a mobile phone number, a personal identification number (PIN), and a biometric signature are all credentials that can be associated with an account of the user.

Figure 2:
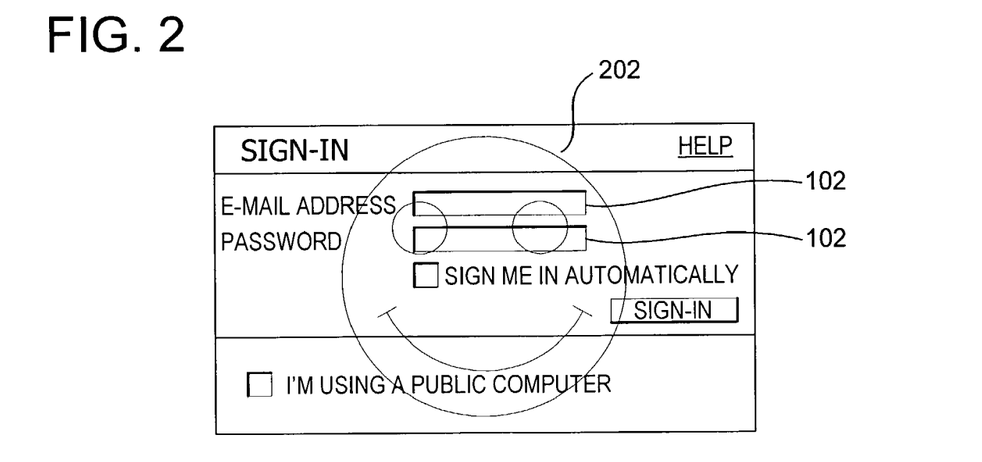
FIG. 2 is a screen shot of an exemplary user interface presenting a sign-in module having an identifying characteristic.

Referring next to FIG. 2, a screen shot shows an exemplary user interface presenting a sign-in module according to one embodiment of the invention. The invention relates to creating an authorized authentication form such as a sign-in module with an identifying characteristic 202 to allow detection of unauthorized authentication forms via the presence or absence of the identifying characteristic 202. That is, the invention preemptively searches for and detects unauthorized authentication forms (e.g., spoofed authentication forms). For example, if the invention detects the presence of the identifying characteristic 202 in a specific authentication form that is not on a list of authorized authentication forms, then the specific authentication form may represent a spoofing attempt in which the form and the identifying characteristic have been reproduced. For example, an attacker may copy the entire user interface (UI) with the authentication form and place the copy on the attacker's web page. The invention software exploring the attacker's web page will detect the identifying characteristic and flag the UI as a potential spoof. As described in greater detail below, in one form, the invention examines each hypertext markup language (HTML) element in the web page to search for the identifying characteristic. In another form, the invention operates to take a screenshot of the web page as rendered by a web browser and execute an algorithm to search for the identifying characteristic within the screen shot. Because the algorithm may occasionally produce a false positive, a watermark may be added to the image for additional assurance. In such an embodiment, after locating the identifying characteristic, the invention software checks for the presence of the watermark. The web page will be flagged as a spoofing attempt only if the watermark is detected.

In an alternative embodiment, if the invention fails to detect the presence of the identifying characteristic 202 in a specific authentication form, then the specific authentication form may represent a spoofing attempt. For example, an attacker may be able to copy all aspects of a legitimate authentication form except for the identifying characteristic. If the identifying characteristic is clearly visible to a user (e.g., a background image), the user will not be fooled into believing that the spoofed UI is genuine.

It is contemplated by the inventors that the invention helps to detect any form of spoofing related to authentication forms. Further, the invention may be applied to any user interface presenting an authentication form such as web pages and web forms. That is, the invention is not limited specifically in application to a sign-in module.

The identifying characteristic 202 illustrated in FIG. 2 is a background image such that the presence/absence of the image is obvious to the user. In one embodiment, a watermark or other identifying characteristic or distinctive marking such as identifying characteristic 202 is hidden in the image and requires possession of key material (e.g., a secret) only available to authorized entities to verify the presence of the watermark. That is, the watermark may be invisible to the user and detectable only via mathematical algorithms. In case of a dispute, any authorized entity may prove that the image carries a watermark by using the key material. The watermark is selected such that it is robust against standard transformations such as conversion to a different format, compression, addition of white noise, and optical distortions. As such, removal of the watermark without altering the picture in a visually obvious way is difficult if not impossible. It is contemplated by the inventors that the invention is operable with any of a plurality of image watermarking methods known in the art.

In one form, the invention relates to cross-network collaboration between web sites as part of a distributed, multi-site user authentication system. Such services provide a user with the ability to access one or more participating web sites or resources with a single sign-in (i.e., via the sign-in module). Although the participating, or affiliate sites still maintain control over permissions, they use the authentication service rather than hosting and maintaining their own proprietary authentication systems. That is, the authentication service presents the sign-in module to the user via the affiliate sites. Those skilled in the art will note that although the invention is described in one embodiment in terms of a multi-site user authentication service or system, it is contemplated by the inventors that the invention is operable with any type and number of authentication systems.

An attacker may attempt to harvest credentials by presenting a sign-in module on a website that is a spoof of the sign-in module of FIG. 2. In order to create a convincing copy of the sign-in module, the attacker needs to copy the background image. The attacker may copy exactly the image from an authorized sign-in module or copy the image with some distortions. However, either copy of the image will include the embedded watermark detectable by the invention (see FIG. 2). Those skilled in the art will note that although the invention is described in one embodiment in terms of a watermark, it is contemplated by the inventors that the invention is operable with any type of identifying characteristic or distinctive marking.

A computer-readable medium stores a data structure representing a user interface for a sign-in module such as illustrated in FIG. 2. The user interface is associated with an authentication system. The sign-in module is presented to the user during authentication. The data structure includes the fields 102 for entry of credential information associated with the user. The credential information includes a user name and/or a password. The data structure further includes the identifying characteristic 202 in the presented sign-in module for indicating that the presented sign-in module is authorized to be associated with the authentication system. The identifying characteristic 202 includes, but is not limited to, one or more of the following: a watermark, a distinctive image, and a distinctive sound.

Figure 3:
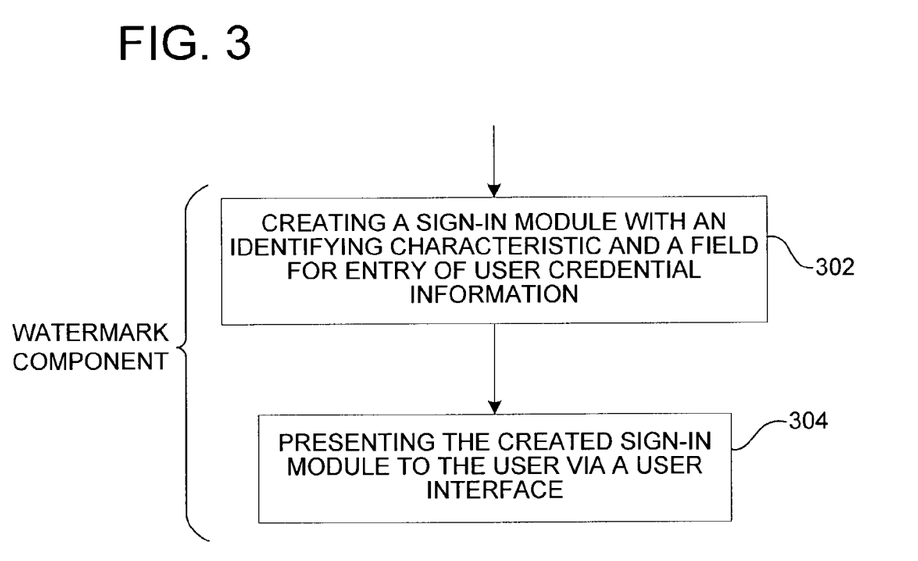
FIG. 3 is an exemplary flow chart illustrating operation of software according to the invention for creating a sign-in module having a sample identifying characteristic.

Referring next to FIG. 3, an exemplary flow chart illustrates operation of software according to the invention for creating a sign-in module having an identifying characteristic such as identifying characteristic 202 in FIG. 2. The invention aids identification of an unauthorized sign-in module by the user. The method includes creating the sign-in module associated with the authentication system at 302. The sign-in module has at least one field such as field 102 in FIG. 2 for entry of user credential information. The sign-in module further includes the identifying characteristic. The method includes presenting the created sign-in module to the user via a user interface at 304. The identifying characteristic in the presented sign-in module indicates that the presented sign-in module is authorized to be associated with the authentication system. One or more computer readable media have computer-executable instructions for performing the method illustrated in FIG. 3.

In the context of a multi-site user authentication system, the method includes presenting the created sign-in module to the user by receiving a request from an affiliate server to present the sign-in module to the user. The multi-site user authentication system delivers, to the affiliate server in response to the received request, the created sign-in module for presentation to the user for entry of the credential information. The affiliate server then presents the sign-in module to the user.

Figure 4:
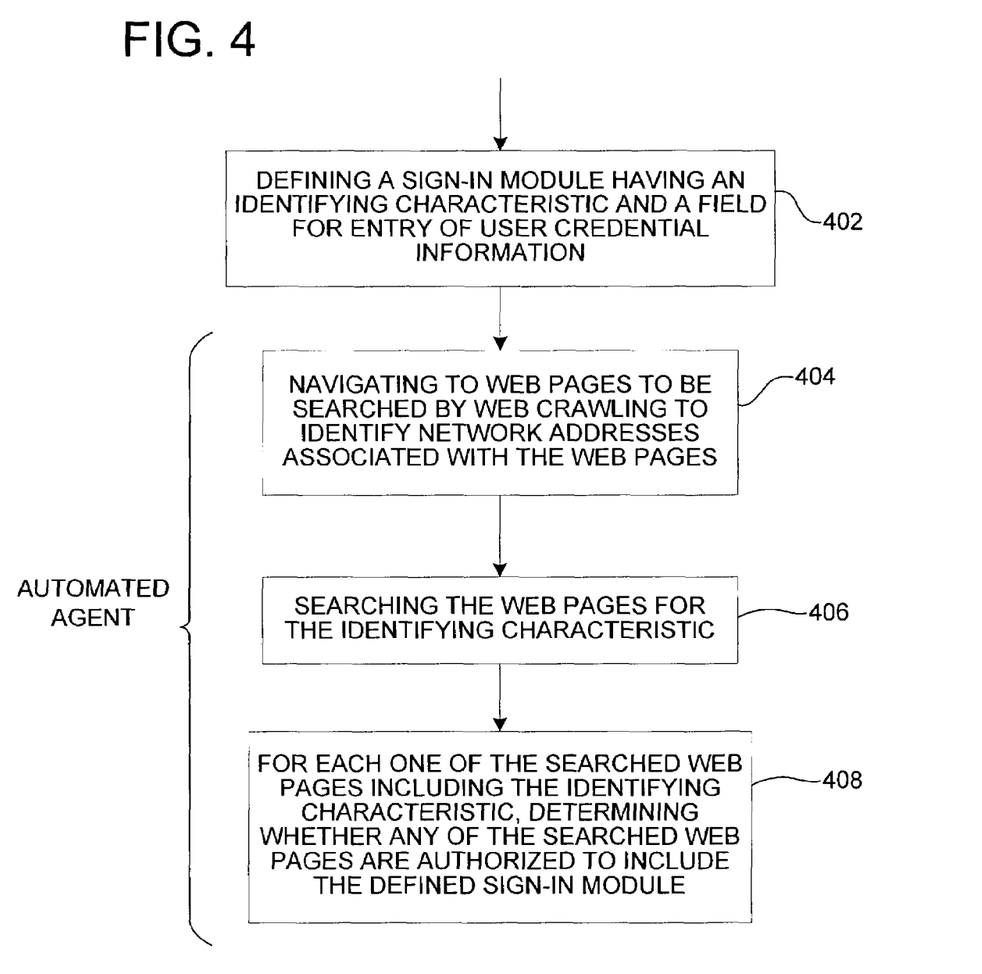
FIG. 4 is an exemplary flow chart illustrating operation of software according to the invention for searching for and detecting sign-in unauthorized sign-in modules having the identifying characteristic.

Referring next to FIG. 4, an exemplary flow chart illustrates operation of software according to the invention for searching for and detecting sign-in unauthorized sign-in modules having the identifying characteristic. The software includes defining at 402 a sign-in module having at least one field such as field 102 in FIG. 2 for entry of user credential information and having an identifying characteristic such as identifying characteristic 202 in FIG. 2. The software also includes searching a plurality of web pages for the identifying characteristic at 406 and determining whether any of the searched web pages having the identifying characteristic are authorized to include the defined sign-in module at 408. The searching may be executed via a web crawling routine. The web crawling routine at 406 identifies network addresses (e.g., uniform resource locators) associated with the web pages to be searched and navigates to the web pages via the identified network addresses. For example, a computing device executes the web crawling routine to identify hyperlinks on the web pages to be searched and to follow the identified hyperlinks to additional web pages for subsequent searching. In one embodiment, the web pages to be searched are accessible via a network such as the Internet. One or more computer readable media have computer-executable instructions for performing the method illustrated in FIG. 4. In one form, a processor associated with the authentication system executes the computer-executable instructions. That is, the instructions are executed independent of the client computer.

In an example in which the identifying characteristic is an image, searching the web pages may include searching all IMG SRC tags or other HTML elements (e.g., text, graphics, and sound) in the HTML documents comprising the web pages. Searching the web pages may also include locating the image as a reference image within another image representing one of the web pages. That is, searching may include executing a location estimation algorithm that takes a snapshot of a web page and attempts to locate the reference image within the snapshot. For example, an attacker may generate a mosaic of the distinctive image by dividing the image into multiple, smaller images. Such a mosaic would defeat searching directed to IMG SRC tags or other HTML elements. Further, an attacker may place the image in any location on the web page. Executing an algorithm such as a location estimation algorithm counters such attempts by an attacker. It is contemplated by the inventors that the invention is operable with any location estimation algorithm or similar routine known to one of ordinary skill in the art.

For example, one such location estimation algorithm uses a statistical correlation to compare a reference image that defines a mark to a test image that may contain the mark. In general, the steps of the algorithm may include determining the dimensions and pixel depth of the test and reference images, allocating buffer space for the images, loading the images, filling the result image with correlation coefficient data calculated between the test image and reference image, and sorting the correlation coefficient data to determine the most probable location of the mark. It is contemplated by the inventors that a person of ordinary skill in the art could generate source code (e.g., in C or C++) to implement such an algorithm. In one embodiment, the invention is operable with a location estimation algorithm that locates a mark within a test image in spite of confusing background clutter and partial occlusion and that accounts for geometric changes in the object's appearance such as caused by viewpoint change.

In an example in which the identifying characteristic is a watermarked image, searching the web pages or determining whether any of the searched web pages having the identifying characteristic are authorized to include the defined sign-in module constitutes attempting to extract the watermark from an image in one of the web pages. If the watermark is extracted successfully, the invention determines that the web page includes the identifying characteristic. If the watermark is not successfully extracted, the invention determines that the web pages lack the identifying characteristic. Successfully and unsuccessfully extracting the watermark depends on the specific watermarking method employed. For example, the watermark may be inserted into the image by applying a secret key (e.g., a mathematical algorithm) to the image. Detecting the watermark then includes employing the secret key to extract the watermark from the original image. In this case, successfully extracting the watermark occurs when the extracted watermark matches the originally inserted watermark. Similarly, unsuccessfully extracting the watermark occurs when the extracted watermark differs from the originally inserted watermark. It is contemplated by the inventors that the invention is operable with any watermarking scheme known in the art.

According to one embodiment, the software also includes defining a list of web pages authorized to display the defined sign-in module. The list of approved sites includes a small, closed-ended list of web sites that are allowed to display the sign-in module with the identifying characteristic. In such an embodiment, determining whether any of the searched web pages are authorized to include the defined sign-in module includes comparing the searched web pages to the defined list of authorized web pages. In response to comparing, the software performs an action if any of the searched web pages are absent from the list of authorized web pages. For example, the software may generate a report and/or an error message.

In one implementation, the invention includes a security system for a sign-in module. The security system comprises a watermark component and an automated agent (e.g., a web crawler or a bot). The watermark component creates the sign-in module associated with an authentication system. The sign-in module has at least one field such as field 102 in FIG. 2 for entry of user credential information and has an identifying characteristic. The created sign-in module is presented to the user via the user interface. The presence of the identifying characteristic in the presented sign-in module indicates that the presented sign-in module is authorized to be associated with the authentication system. The automated agent searches a plurality of web pages for the identifying characteristic. The automated agent also determines whether each one of the searched web pages including the identifying characteristic is authorized to include the sign-in module created by the watermark component. For example, the automated agent includes a location estimation algorithm as described above. In one form, the watermark module and the automated agent are stored on a computer-readable medium as computer-executable components.

In a multi-site user authentication system embodiment, the security system further includes an authentication component for presenting the sign-in module created by the watermark component to the user. Presenting the sign-in module includes receiving, by the multi-site user authentication system, a request from the affiliate server to present the sign-in module to the user. Presenting the sign-in module also includes delivering, to the affiliate server in response to the received request, the created sign-in module for presentation to the user for entry of the credential information.

Figure 5:
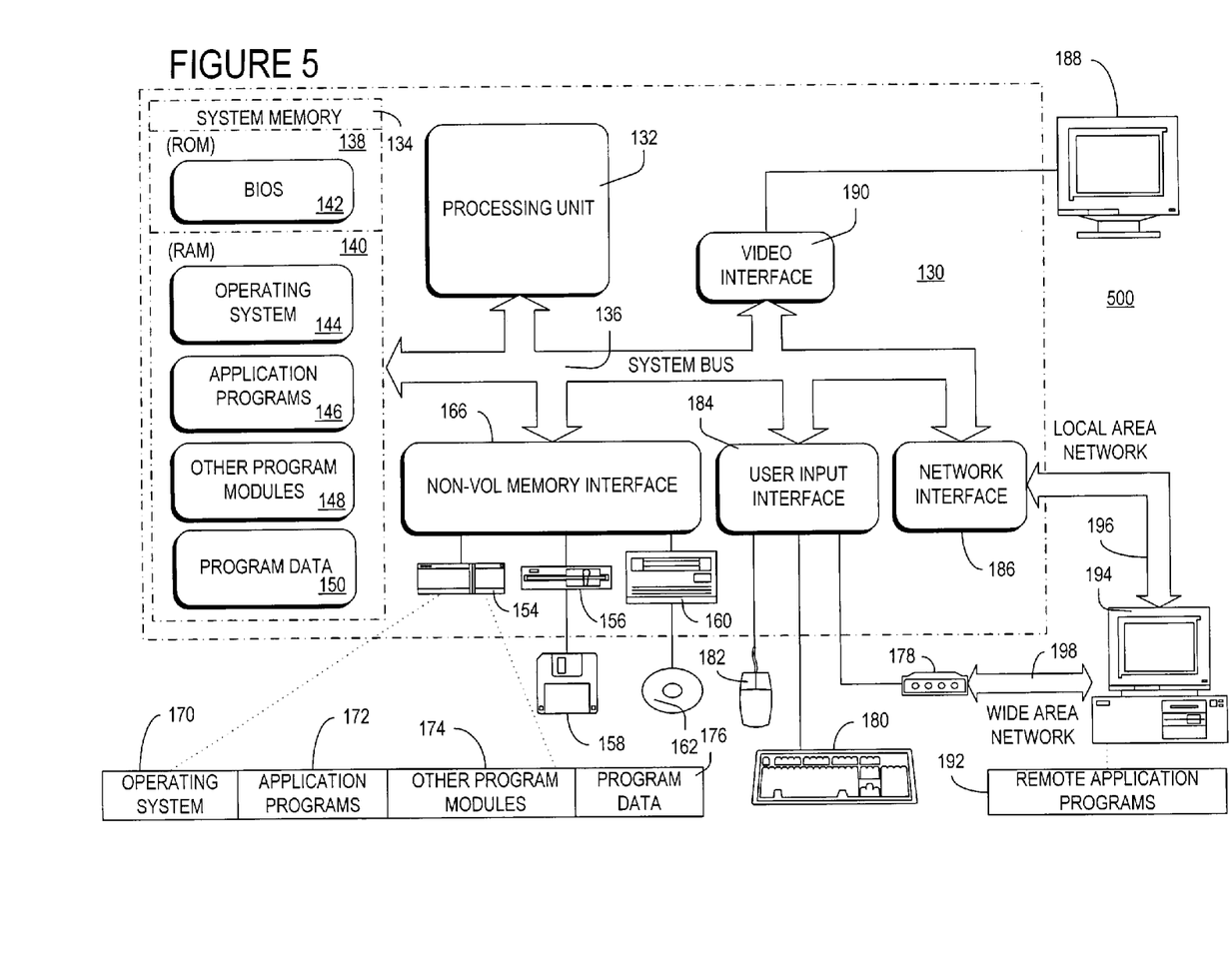
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 3 to create the sign-in module having the field 102 for entry of user credential information and having an identifying characteristic. Further, computer 130 executes computer-executable instructions such as those illustrated in FIG. 4 to search web pages for the identifying characteristic and determine whether the searched web pages are authorized to include the created sign-in module.

Further, computer storage media such as described with reference to FIG. 5 store a data structure representing a user interface for the sign-in module associated with an authentication system. The sign-in module is presented to the user during authentication. The data structure includes a field such as field 102 in FIG. 2 for entry of credential information associated with the user. The data structure also includes an identifying characteristic in the presented sign-in module for indicating that the presented sign-in module is authorized to be associated with the authentication system.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of aiding identification of an unauthorized sign-in module by a user, said method comprising:
  creating a sign-in module associated with a multi-site user authentication system, said sign-in module having a field for entry of credential information associated with each user, said sign-in module further having an identifying characteristic indicating the sign-in module is authorized to be associated with the multi-site user authentication system, said identifying characteristics comprising at least one of a distinctive image a distinctive sound, and a watermark;
  accessing a plurality of web pages;
  preemptively searching, by the multi-site user authentication system, the plurality of web pages for the identifying characteristic;
  for each one of the searched web pages including the identifying characteristic, determining, by the multi-site user authentication system, whether said one of the searched web pages is the web page associated with an authorized affiliate server authorized to include the created sign-in module, said determining including comparing said one of the searched web pages with a list of authorized affiliate servers maintained by the multi-site user authentication system;
  receiving, by the multi-site user authentication system, a request from one of the authorized affiliate servers to present the sign-in module to the user;
  delivering, to the requesting authorized affiliate server in response to the received request, the created sign-in module; and
  presenting, via the authorized affiliate server, the created sign-in module to the user via a user interface for entry of the credential information, said identifying characteristic in the presented sign-in module indicating to the user that the presented sign-in module is authorized to be associated with the multi-site user authentication system.

2. The method of claim 1, wherein the identifying characteristic comprises one or more of the following: a watermark, a distinctive image, and a distinctive sound.

3. The method of claim 1, wherein the credential information comprises a user name or a password or both.

4. The method of claim 1, wherein one or more computer readable media have computer-executable instructions for performing the method recited in claim 1.

5. A method comprising:
  defining a sign-in module to be provided to a user, for an affiliate server in a multi-site user authentication system, said sign-in module having a field for entry of credential information associated with the user, said sign-in module further having an identifying characteristic indicating the sign-in module is authorized to be associated with the multi-site user authentication system;
  searching a plurality of web pages for the identifying characteristic; and
  for each one of the searched web pages including the identifying characteristic, determining, by the multi-site user authentication system, whether said one of the searched web pages is authorized to include the defined sign-in module to detect unauthorized sign-in modules wherein the identifying characteristic comprises an image with a watermark, and wherein searching the plurality of web pages comprises attempting to extract the watermark from an image in one of the plurality of web pages to determine if said one of the plurality of web pages includes the identifying characteristic.

6. The method of claim 5, further comprising defining a list of web pages authorized to display the defined sign-in module.

7. The method of claim 6, wherein determining whether said one of the searched web pages is authorized to include the defined sign-in module comprises comparing said one of the searched web pages to the defined list of authorized web pages.

8. The method of claim 7, further comprising performing an action if said one of the searched web pages is absent from the list of authorized web pages.

9. The method of claim 8, wherein performing the action comprises generating a report or an error message or both.

10. The method of claim 5, further comprising:
  performing a web crawling routine to identify network addresses associated with the plurality of web pages to be searched; and
  navigating to the plurality of web pages via the identified network addresses.

11. The method of claim 5, wherein the plurality of web pages to be searched is accessible via a network.

12. The method of claim 5, wherein searching the plurality of web pages comprises searching each one of the plurality of web pages by locating the identifying characteristic as a reference image within a source image, said source image representing said one of the plurality of web pages.

13. The method of claim 5, wherein searching the plurality of web pages comprises searching for the identifying characteristic as a hypertext markup language element in the plurality of web pages.

14. The method of claim 5, wherein the identifying characteristic comprises one or more of the following: a watermark, a distinctive image, and a distinctive sound.

15. The method of claim 5, wherein one or more computer readable media have computer-executable instructions for performing the method recited in claim 5.

16. A system comprising:

a watermark component for creating a sign-in module associated with a server authentication system, said sign-in module having a field for entry of credential information associated with the user, said sign-in module further having an identifying characteristic, said created sign-in module being presented to the user via a user interface, said identifying characteristic in the presented sign-in module indicating to the user that the presented sign-in module is authorized by the server authentication system to be associated with the server authentication system; and an automated agent for searching a plurality of web pages for the identifying characteristic and determining whether each one of the searched web pages including the identifying characteristic is authorized by the server authentication system to include the sign-in module created by the watermark component;

a server authentication component for presenting the sign-in module created by the watermark component to the user, said presenting comprising:

receiving, by a multi-site user authentication server system, a request from a server to present the sign-in module to the user;

determining if the requesting server is authorized; and delivering, to the requesting server in response to the received request, the created sign-in module for presentation to the user for entry of the credential information when the determining indicates that the requesting server is authorized.

17. The system of claim 16, wherein the watermark module and the automated agent are stored on a computer-readable medium as computer-executable components.

18. The system of claim 16, wherein the automated agent comprises a location estimation algorithm for locating a reference image in another image.

19. The system of claim 16, wherein the automated agent comprises a web crawler for identifying network addresses associated with the web pages to be searched.

20. The system of claim 16, wherein the automated agent searches the plurality of web pages for the identifying characteristic by searching for the identifying characteristic as a hypertext markup language element in the plurality of web pages.

21. A method of aiding identification of an unauthorized sign-in module by a user, said method comprising:

creating a sign-in module associated with a multi-site user authentication system, said sign-in module having a field for entry of credential information associated with each user, said sign-in module further having an identifying characteristic indicating the sign-in module is authorized to be associated with the multi-site user authentication system;

accessing a plurality of web pages;

preemptively searching, by the multi-site user authentication system, the plurality of web pages for the identifying characteristic;

for each one of the searched web pages including the identifying characteristic, determining, by the multi-site user authentication system, whether said one of the searched web pages is the web page associated with an authorized affiliate server authorized to include the created sign-in module;

marking searched web pages that do not include the identifying characteristic with a flag in response to the determining;

receiving, by the multi-site user authentication system, a request from one of the authorized affiliate servers to present the created sign-in module to the user;

delivering, to the requesting authorized affiliate server in response to the received request, the created sign-in module if it is determined that the requesting affiliated server is one of the authorized affiliate server; and presenting, via the authorized affiliate server, the created sign-in module to the user via a user interface for entry of the credential information, said identifying characteristic in the presented sign-in module indicating to the user that the presented sign-in module is authorized to be associated with the multi-site user authentication system.

* * * * *

UNITED STATES PATENT AND TRADEMARK OFFICE
CERTIFICATE OF CORRECTION

| | | |
|---|---|---|
| PATENT NO. | : 7,360,092 B1 | |
| APPLICATION NO. | : 10/424305 | |
| DATED | : April 15, 2008 | |
| INVENTOR(S) | : Christopher N. Peterson et al. | |

It is certified that error appears in the above-identified patent and that said Letters Patent is hereby corrected as shown below:

In column 11, line 40, in Claim 1, delete "image" and insert -- image, --, therefor.

In column 12, line 10, in Claim 5, delete "module" and insert -- module, --, therefor.

Signed and Sealed this
Twenty-second Day of February, 2011

David J. Kappos
*Director of the United States Patent and Trademark Office*